United States Patent
Vetteth et al.

(10) Patent No.: US 11,468,200 B2
(45) Date of Patent: Oct. 11, 2022

(54) SYSTEM AND METHOD FOR CRYPTOGRAPHICALLY COUPLING A MEDIA CONTROLLER TO A BASEBOARD MANAGEMENT CONTROLLER

(71) Applicant: DELL PRODUCTS, LP, Round Rock, TX (US)

(72) Inventors: Kiran Vetteth, Round Rock, TX (US); Marshal Savage, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 245 days.

(21) Appl. No.: 16/863,550

(22) Filed: Apr. 30, 2020

(65) Prior Publication Data

US 2021/0342491 A1  Nov. 4, 2021

(51) Int. Cl.

| | | |
|---|---|---|
| G06F 21/78 | (2013.01) | |
| G06F 21/57 | (2013.01) | |
| G06F 21/62 | (2013.01) | |
| H04L 9/06 | (2006.01) | |
| G06F 9/445 | (2018.01) | |
| G06F 9/4401 | (2018.01) | |
| H04L 101/622 | (2022.01) | |

(52) U.S. Cl.
CPC ............ *G06F 21/78* (2013.01); *G06F 9/4401* (2013.01); *G06F 9/44505* (2013.01); *G06F 21/575* (2013.01); *G06F 21/6209* (2013.01); *H04L 9/0643* (2013.01); *H04L 2101/622* (2022.05)

(58) Field of Classification Search
CPC .... G06F 21/78; G06F 9/4401; G06F 9/44505; G06F 21/575; G06F 21/6209; G06F 21/79; H04L 9/0643; H04L 61/6022; H04L 9/0866; H04L 9/3239
See application file for complete search history.

(56) References Cited

U.S. PATENT DOCUMENTS

| | | | |
|---|---|---|---|
| 10,321,313 B2 | 6/2019 | Young et al. | |
| 10,534,936 B2 | 1/2020 | Young et al. | |
| 2009/0083539 A1* | 3/2009 | Catherman | ............. G06F 21/57 713/156 |
| 2009/0268915 A1* | 10/2009 | Kelly | .................... H04L 9/0877 380/282 |
| 2014/0344159 A1* | 11/2014 | Savage | .................. G06Q 99/00 705/59 |
| 2014/0365763 A1* | 12/2014 | Manohar | ............... H04L 9/0877 713/156 |
| 2018/0181426 A1* | 6/2018 | Shi | ....................... G06F 9/45558 |

\* cited by examiner

*Primary Examiner* — Mohammad W Reza
(74) *Attorney, Agent, or Firm* — Larson Newman, LLP

(57) ABSTRACT

An information handling system includes a baseboard management controller and a media controller. The baseboard management controller includes a memory, and an immutable attribute of the baseboard management controller is fused in the memory during a factory process of the information handling system. The baseboard management controller generates a first seed value based on the immutable attribute, generates a first key value based on the first seed value, and provides the first key value. The media controller includes a secure memory and a processor. The processor receives the first key value from the baseboard management controller, and stores, during the factory process, the first key value in the secure memory. The first key value cryptographically links the secure memory to the baseboard management controller.

20 Claims, 5 Drawing Sheets ents illustrated in the Figures are not necessarily drawn to scale. For example, the dimensions of some elements may be exaggerated relative to other elements. Embodiments incorporating teachings of the present disclosure are shown and described with respect to the drawings herein, in which:

SYSTEM AND METHOD FOR CRYPTOGRAPHICALLY COUPLING A MEDIA CONTROLLER TO A BASEBOARD MANAGEMENT CONTROLLER

FIELD OF THE DISCLOSURE

The present disclosure generally relates to information handling systems, and more particularly relates to cryptographically coupling a media controller to a baseboard management controller.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements may vary between different applications. Thus information handling systems may also vary regarding what information is handled, how the information is handled, how much information is processed, stored, or communicated, and how quickly and efficiently the information may be processed, stored, or communicated. The variations in information handling systems allow information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, graphics interface systems, data storage systems, networking systems, and mobile communication systems. Information handling systems may also implement various virtualized architectures. Data and voice communications among information handling systems may be via networks that are wired, wireless, or some combination.

SUMMARY

An information handling system includes a baseboard management controller that generates a first key value based on an immutable attribute. A media controller receives the first key value from the baseboard management controller, and stores, during a factory process, the first key value in the secure memory. The first key value cryptographically links the secure memory to the baseboard management controller.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
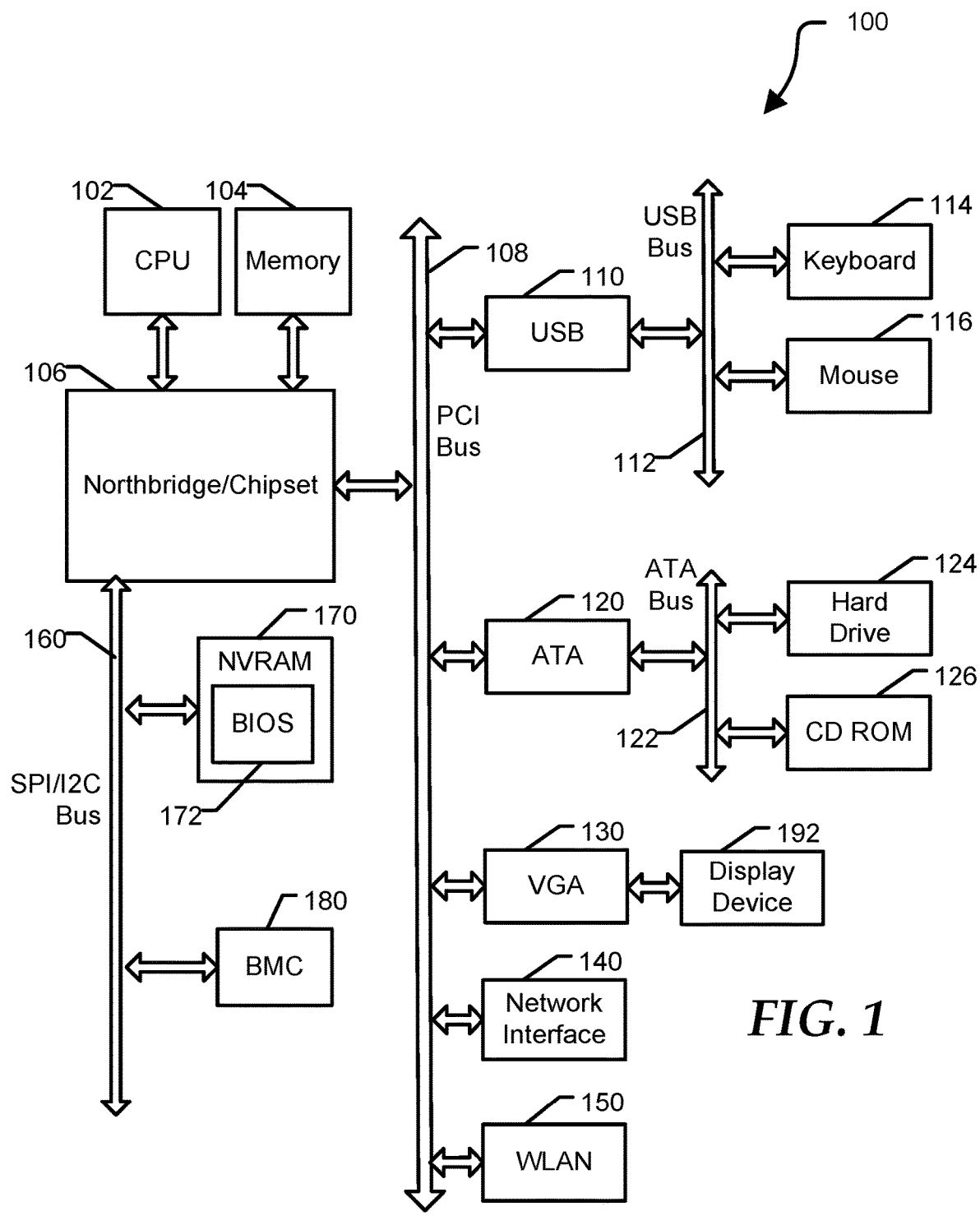
FIG. 1 is a block diagram of a general information handling system according to at least one embodiment of the disclosure.

FIG. 1 illustrates a general information handling system 100 including a processor 102, a memory 104, a northbridge/chipset 106, a PCI bus 108, a universal serial bus (USB) controller 110, a USB bus 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an embodiment, information handling system 100 may be information handling system 200 of FIG. 2. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional buses, not shown for clarity. For example, system 100 can include multiple processor cores, audio devices, and the like. While a particular arrangement of bus technologies and interconnections is illustrated for the purpose of example, one of ordinary skilled in the art will appreciate that the techniques disclosed herein are applicable to other system architectures. System 100 can include multiple CPUs and redundant bus controllers. One or more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. For example, device controller 130 may provide data to a display device 190 to visually present the information to an individual associated with information handling system 100. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
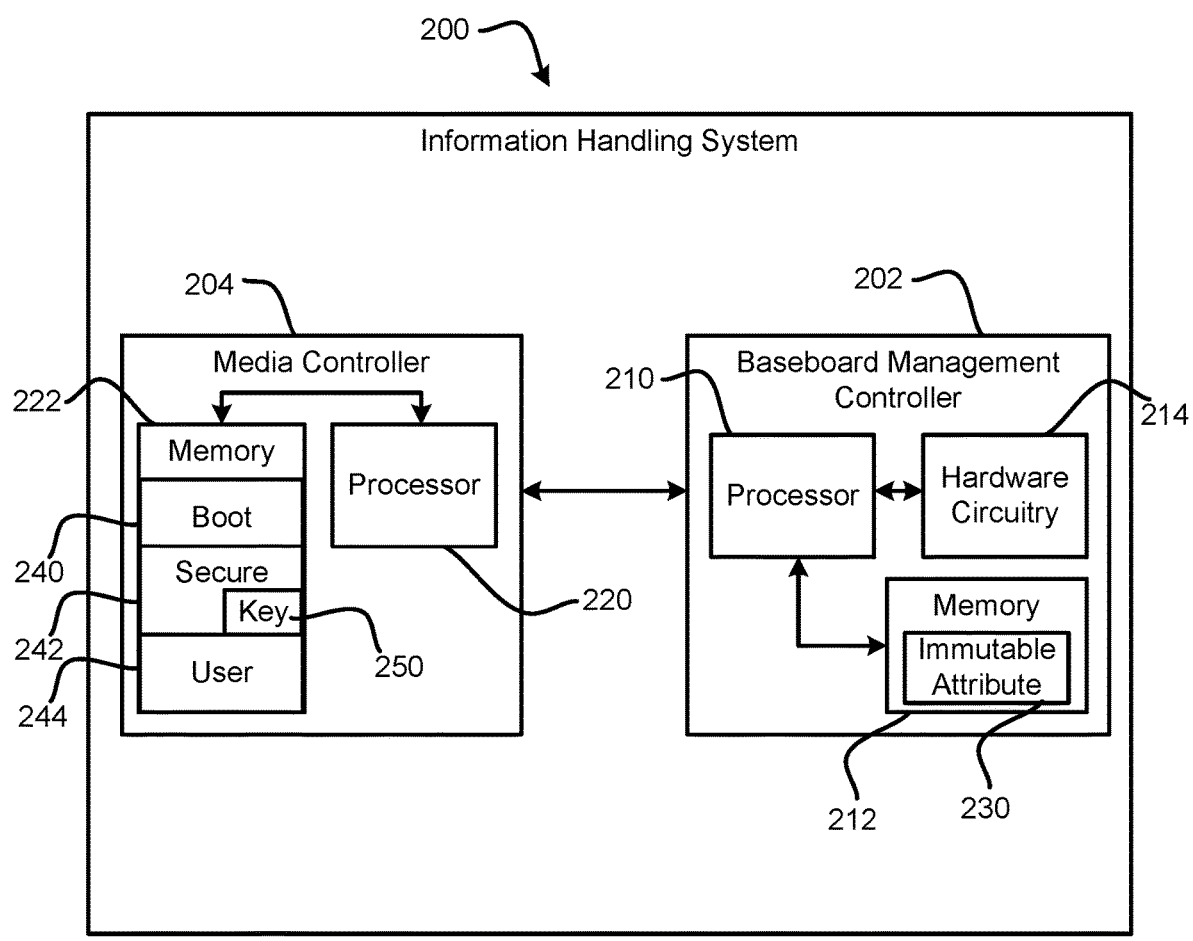
FIG. 2 is a block diagram of a portion of an information handling system for cryptographically coupling a media controller to a baseboard management controller according to at least one embodiment of the disclosure.

FIG. 2 shows a portion of an information handling system 200 for cryptographically coupling a media controller to a baseboard management controller according to at least one embodiment of the disclosure. Information handling system 200 may be included in any suitable system with any additional components including, but not limited to, a management server rack, one or more server racks, and a display device. Information handling system 200 may be employed, in whole or in part, by information handling system 100 illustrated in FIG. 1, or any other system, device, component, or the like operable to employ portions, or all of, the information handling system. In an example, information handling system 200 may include more components than shown in FIG. 2 without varying from the scope of this disclosure. In an example, information handling system may be any suitable component within the system including, but not limited to, a server rack. Information handling system includes any suitable component or devices including a baseboard management controller (BMC) 202, a media controller 204, and other components.

In an example, the other components may include any suitable components of a server rack, such as one or more servers, and each server may include one or more processors, one or more memory devices, one or more fans, one or more PCIe devices, or the like. BMC 202 may include any suitable component including, but not limited to, a processor 210, a memory 212, and hardware circuitry 214. Media controller 204 may include any suitable component including, but not limited to, a processor 220 and a memory 222.

In an example, BMC 202 may be any suitable type of controller, such as a BMC in accordance with an IPMI specification, and may be configured to provide out-of-band management facilities for management of information handling system 200. Such management may be made by BMC 202 even if information handling system 200 is powered off or powered to a standby state. In certain embodiments, BMC 202 may include or may be an integral part of a remote access controller (e.g.; a Dell Remote. Access Controller or Integrated Dell Remote Access Controller [iDRAC]). Information handling system 200 is described herein as a data center including multiple server racks and each server rack includes multiple servers, such as data storage servers. However, one of ordinary skill in the art would recognize that the operations described herein may be applied to a modular chassis system with multiple servers/sleds without varying from the scope of the disclosure.

In an example, media controller 204 may be any suitable component or device to control access to a memory, such as memory 222. For example, media controller 204 may be an embedded multi-media controller (eMMC) or embedded memory chip that is soldered to or otherwise linked to a printed circuit board that also includes BMC 202. Thus, media controller 204 may include memory 222 and processor or controller 220 on the same die. In certain examples, media controller 204 may operated according to any suitable standard including, but not limited to, the JEDEC standard.

Each of processors 210 and 230 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, each of processors 210 and 230 may interpret and/or execute program instructions and/or process data stored in a respective associated memory 212 and 232 and/or another component of its associated information handling system 200.

Memory 212 may be communicatively coupled to processor 210 and may include any system, device, or apparatus configured to retain program instructions and/or data for a period of time (e.g., computer-readable media). Memory 212 may include RAM, EEPROM, a PCMCIA card, flash memory, magnetic storage, opto-magnetic storage, or any suitable selection and/or array of volatile or non-volatile memory that retains data after power to information handling system 102 is turned off. Memory 212 may comprise a persistent memory (e.g., comprising one or more NVDIMMs) that includes a volatile memory (e.g., DRAM or other volatile random-access memory) and non-volatile memory (e.g., flash memory or other non-volatile memory). Memory 212 may store any suitable data including, but not limited to, an immutable attribute 230 of BMC 202. Memory 222 may be any suitable type of non-volatile memory. Memory 222 may store any suitable data and be divided into multiple partitions including, but not limited to, a boot partition 240, a secure memory partition 242, and a user partition 244. In an example, boot partition 240 may store code for information handling system 200 including, but not limited to, BootLoader, kernel, and root file systems. Secure memory partition 242 may be any suitable memory block including, but not limited to, a replay protected memory block (RPMB) to store data that is designed to be tamper protected.

During a manufacturing process, such as a factory process for information handling system 200, media controller 204 including memory 222 may be soldered or otherwise connected to a printed circuit board of the information handling system. In an example, the factory process may be any suitable process including, but not limited to, a printed circuit board assembly (PCBA) factory process. In certain examples, the printed circuit board of information handling system 200 may include multiple components, such BMC 202. Media controller 204 and memory 222 may be tied to BMC 202, such that data in secure memory 242 is only accessible to the BMC. However, previous information handling systems were susceptible to various hacks to break the supply chain security between media controller 204 and BMC 202. For example, media controller 204 may be removed and replaced with another media controller while the information handling system is being shipped to the customer. Additionally, previous information handling systems utilized a single key for all products, such that knowledge by a hacker of one key exposes all products. Thus, information handling system 200 is improved herein by cryptographically coupling media controller 204 to BMC 202 during the factory process.

During the factory process and after media controller 204 is coupled to BMC 202, information handling system 200 may booted. For example, a BootLoader program may executed in any suitable mode of operation including, but not limited to, a factory mode. In an example, the BootLoader operation may cause processor 210 to read immutable attribute 230 for BMC 202 from memory 212. Immutable attribute 230 may be any identifier of BMC 202 that cannot be changed, altered, or spoofed. For example, immutable attribute 230 may be any suitable identifier associated with BMC 202 including, but not limited to, a media access control (MAC) address of the BMC that is specific to the BMC. In an example, the MAC address may be fused in memory 212 of BMC 202, such that once the MAC address is written to the memory the MAC address cannot be changed.

Upon an application, executed by processor 210, reading immutable attribute 230 from memory 212, the application may provide the immutable attribute to hardware circuitry 214. Hardware circuitry 214 may be any suitable circuit including, but not limited to a cryptography engine. In response to receiving immutable attribute 230, hardware circuitry 214 may perform one or more operations to generate a seed value that is a function of the immutable attribute. For example, hardware circuitry 214 may utilize a hidden root key (HRK) security module to encrypt immutable attribute 230 using a hidden BMC specific root key. The application executed by processor 210 may receive the encrypted immutable attribute from hardware circuitry 214.

In an example, processor 210 may generate a key value based on the seed value and the immutable attribute 230. For example, any suitable module or component including, but not limited to, a Replay Protected Memory Block (RPMB) Key Generation (RKG) module or Dell RPMB Key Generation (DRKG) module, within processor 210 may perform one or more functions or operations to generate the key value. In an example, processor 210 may generate the key value by any suitable method or function including, but not limited to, a Password-Based Key Derivation Function (PBKDF). For example, if the key value is generated using PBKDF, processor 210 may utilize the following function:

$$\text{Key value}=\text{PBKDF}(\text{MAC\_address},\text{seed\_value},<\text{iterations}>,N) \qquad \text{EQ. 1}$$

The variables in the function or equation above are: PBKDF( ) is the PBKDF function; MAC_address is the MAC address of the baseboard management controller; seed_value is the generated seed value; <iterations> is the number of iterations or times the function is executed; and N is the desired bit-length of the key value in bytes. In an example, the number of iterations may be any suitable number including, but not limited to, 1000, 1200, 1400, and 1500. The desired bit-length of the key value may be any suitable number including, but not limited to, 128 bytes, 256 bytes, 512 bytes, and 1024 bytes. In response to key value being generated, processor 210 may provide the generated key to media controller 204.

In response to media controller 204 receiving the generated key value, processor 220 may store the key value in the secure memory partition 242 of memory 222 as key value 250. In an example, generated key value 250 may be stored in secure memory 242 via any suitable operation including, but not limited to, a one time flash write to the secure memory. In response to key value 250 being stored in secure memory 242, the factory operations for information handling system 200 may be continued until the manufacturing of the information handling system is completed.

During operation of information handling system 200, BMC 202 and media controller 202 may perform one or more operations to determine whether the information handling system may be authenticated to launch in a secure boot mode. In an example, processor 210 may execute a BootLoader program, which may be retrieved from any suitable memory, such as memory 222. During execution of the BootLoader program, processor 210 may perform one or more operations in an attempt to access data in secure memory 242 and launch information handling system 200 in a secure boot mode. For example, the BootLoader operation may cause processor 210 to read immutable attribute 230 for BMC 202 from memory 212. In response to the application, executed by processor 210, reading immutable attribute 230 from memory 212, the application may provide the immutable attribute to hardware circuitry 214. In response to receiving immutable attribute 230, hardware circuitry 214 may perform one or more operations to generate a seed value that is a function of the immutable attribute as described above. Hardware circuitry 214 may then generate a key value based on immutable attribute 230 and the seed values as described above. In response to the key value being generated, processor 210 may utilize the key value to generate a hash of immutable attribute 230. In an example, the hash may be any suitable hash value. For example, if immutable attribute 230 is the MAC address of BMC 202, the hash value may be a hash of the MAC address (HMAC) based on the key value. Processor 210 may then provide the hash and immutable attribute 230 to media controller 204.

In response to receiving the hash value and immutable attribute 230, processor 220 of media controller 204 may perform one or more operations to determine whether BMC 202 is authenticated to access secure memory 242. For example, processor 220 may generate a hash of immutable attribute 230 via any suitable manner. In an example, processor 220 may generate the hash based on key value 250 stored in secure memory 242 and immutable attribute 230. In an example, processor 220 may compare the generated hash value to hash value received from BMC 202. If the generated hash value matches the hash value received from BMC 202, processor 220 may determine that the BMC is authenticated to access secure memory 242. In an example, the contents of the secure memory may be verified based on BMC 202 being granted access to secure memory 242, and information handling system 200 may launch a boot kernel to launch the information handling system in a secure boot mode.

However, if the generated hash value does not match hash value received from BMC 202, processor 220 may determine the BMC is not authenticated and initiate a security policy for information handling system. In an example, the security policy may be any suitable policy to prevent access of secure memory 242. For example, the suitable policy may include, but is not limited to, any combination of: disabling the hidden root key of BMC 202; disabling the secure boot operation; executing a full stop of operations within information handling system 200; and causing a light to flash on the information handling system. Thus, in response to the security policy being initiated, the tamper proof sensitive data residing on an RPMB portion, such as secure memory 242, of memory 222 cannot be accessed. Therefore, the data within secure memory 242 may only be access by a secure booted firmware, such that programmers cannot access the data.

In an example, authentication of BMC 202 may also be made based on access requests of secure memory 242 during runtime operations of information handling system 200. In response to an access request of secure memory 242 by BMC 202, processor 210 may read immutable attribute 230 for BMC 202 from memory 212. In response to processor 210 reading immutable attribute 230, the processor may provide the immutable attribute to hardware circuitry 214, which in turn may perform one or more operations to generate a hash of the immutable attribute as described above. Processor 210 may then provide both the hash of immutable attribute 230 and the immutable attribute to media controller 204.

In response to receiving the hash value and immutable attribute 230, processor 220 of media controller 204 may perform one or more operations to determine whether BMC 202 is authenticated to access secure memory 242. For example, processor 220 may generate a hash value immutable attribute 230 and key value 250. If the generated hash value matches the received hash value, processor 220 may determine that BMC 202 is authenticated to access secure memory 242 and enable access by the BMC.

However, if the generated hash value does not match the received hash value, BMC 202 is not authenticated and a security policy for information handling system is initiated. In an example, the security policy may be any suitable policy to prevent access of secure memory 242. For example, the suitable policy may include, but is not limited to, any combination of: disabling the hidden root key of BMC 202; disabling the secure boot operation; executing a full stop of operations within information handling system 200; and causing a light to flash on the information handling system. Thus, in response to the security policy being initiated, the tamper proof sensitive data residing on an RPMB portion, such as secure memory 242, of memory 222 cannot be accessed. Therefore, the data within secure memory 242 may only be access by a secure booted firmware, such that programmers cannot access the data.

Figure 3:
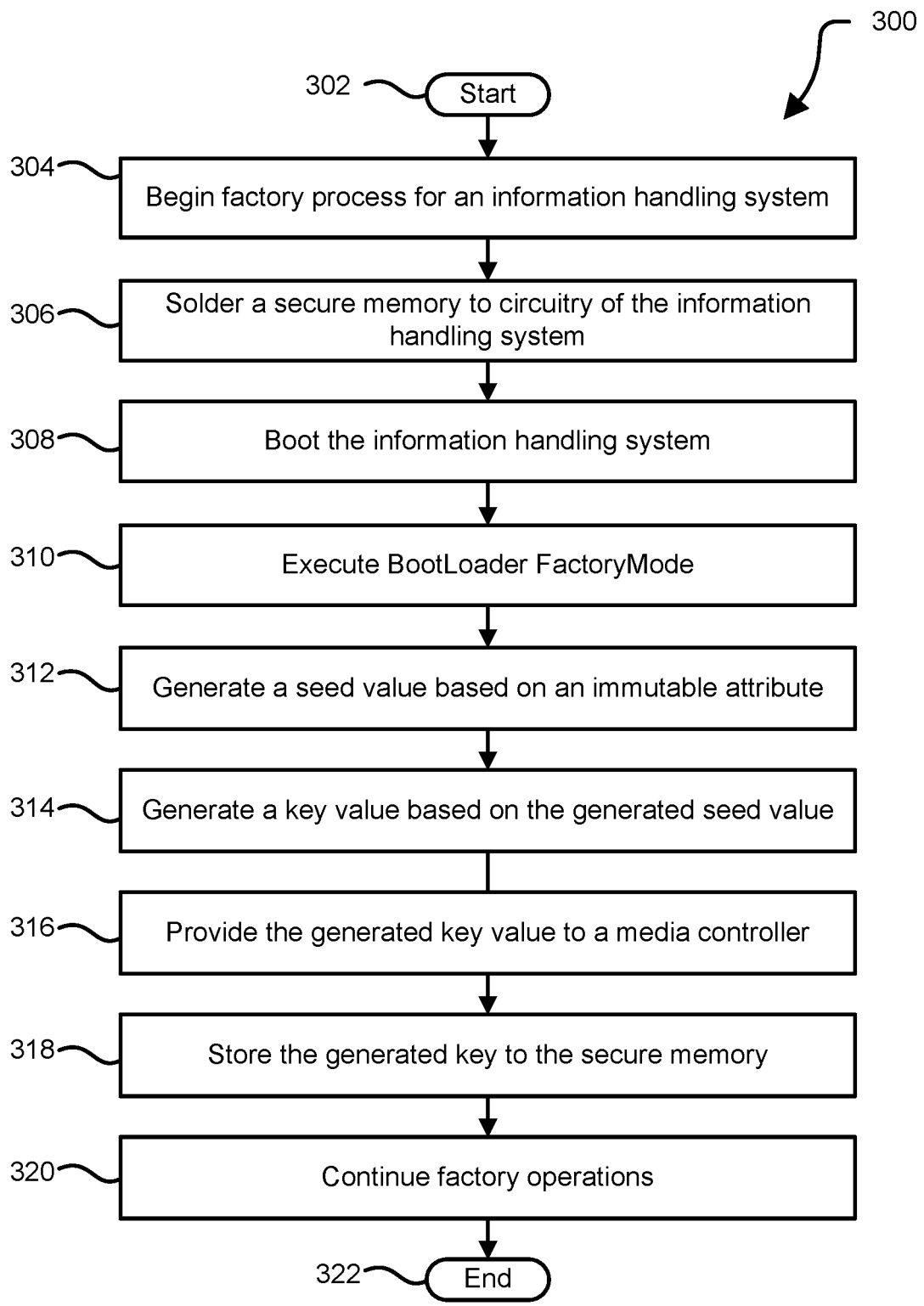
FIG. 3 is a flow diagram illustrating a method for cryptographically coupling a secure memory of a media controller to a baseboard management controller according to at least one embodiment of the disclosure.

FIG. 3 shows a method 300 for cryptographically coupling a secure memory of a media controller to a baseboard management controller according to at least one embodiment of the disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 3.

At block 304, a factory process for an information handling system is begun. In an example, the factory process may be any suitable process including, but not limited to, a printed circuit board assembly (PCBA) factory process. In certain examples, the information handling system may include multiple components, such as circuitry including a baseboard management controller. At block 306, a secure memory is soldered to the circuitry of the information handling system. In an example, the secure memory may be part of any suitable media controller including, but not limited to, an embedded multi-media controller (eMMC) chip. At block 308, the information handling system is booted. At block 310, a BootLoader program is executed. In an example, the BootLoader program may be executed in any suitable mode of operation including, but not limited to, a factory mode.

At block 312, a seed value is generated based on an immutable attribute of the baseboard management controller. In an example, the immutable attribute may be any attribute that cannot be spoofed or otherwise manipulated after the secure memory is initially bond to the baseboard management controller during the factory process. For example, the immutable attribute may be any identifier associated with the baseboard management controller including, but not limited to, a media access control (MAC) address of the baseboard management controller. In certain examples, the MAC address may be fused to the baseboard management controller, and the MAC address may be encrypted before the seed value is generated. In an example, the MAC address may be encrypted via any suitable operation including, but not limited to, a hidden root key operation. In certain examples, the encryption of the MAC address may be performed by any suitable hardware circuitry within the baseboard management controller including, but not limited to, a cryptography engine of the baseboard management controller.

At block 314, a key value is generated based on the generated seed value. In an example, the key value may be generated by a module of a processor within the baseboard management controller or hardware circuitry of the baseboard management controller. For example, any suitable module or component within the media controller including, but not limited to, a Replay Protected Memory Block (RPMB) Key Generation (RKG) module or Dell RPMB Key Generation (DRKG) module. In an example, the key value may be generated by any suitable method or function including, but not limited to, a Password-Based Key Derivation Function (PBKDF) as described above with respect to FIG. 2.

At block 316, the generated key value provided to a media controller. In an example, the media controller may be an embedded multi-media controller (eMMC) or embedded memory chip that is soldered to or otherwise linked to a printed circuit board that also includes the BMC. At block 318, the generated key value is stored to the secure memory. In an example, the generated key value may be stored via any suitable operation including, but not limited to, a one time flash write to the secure memory. In certain examples, the key value may be stored in the secure memory by any suitable component within the media controller including, but not limited to, a processor, and a controller of the media controller. At block 320, the factory operations for the information handling system are continued, and the method ends at block 322.

Figure 4:
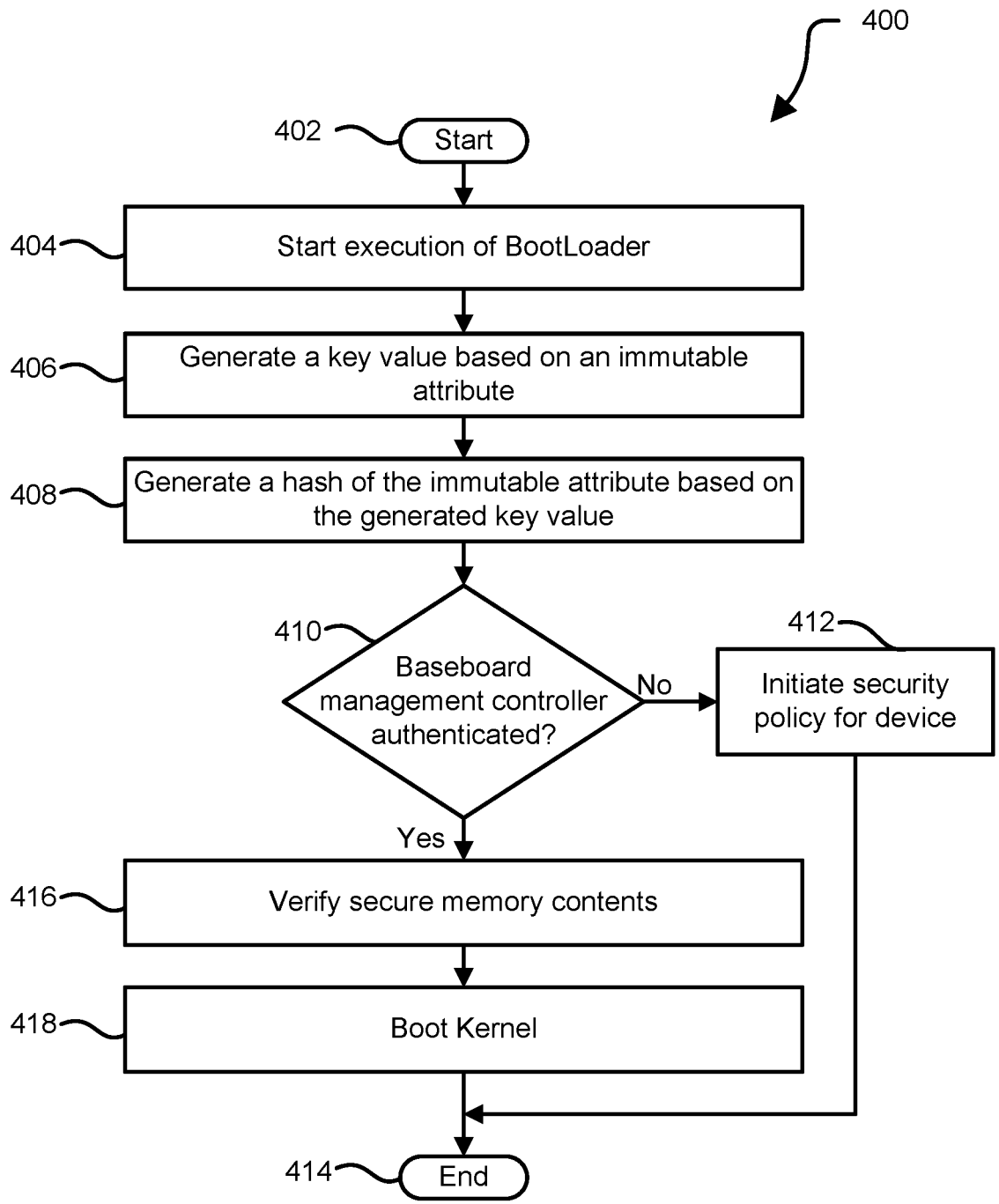
FIG. 4 is a flow diagram illustrating a method for authenticating a baseboard management controller access of a media controller during a boot operation according to at least one embodiment of the disclosure.

FIG. 4 shows a method 400 for authenticating a baseboard management controller access of a secure memory in a media controller chip during a boot operation according to at least one embodiment of the disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 4.

At block 404, a BootLoader program is executed in an information handling system. In an example, the BootLoader program may be executed during any suitable operation including, but not limited to, a UEFI boot operation. At block 406, a key value is generated based on an immutable attribute of the baseboard management controller. In an example, the immutable attribute may be any attribute that cannot be spoofed or otherwise manipulated after the secure memory is initially bond to the baseboard management controller during the factory process. For example, the immutable attribute may be any identifier associated with the baseboard management controller including, but not limited to, a MAC address of the baseboard management controller. In certain examples, the MAC address may be fused to the baseboard management controller, and the MAC address may be encrypted before the seed value is generated. In an example, the MAC address may be encrypted via any suitable operation including, but not limited to, a hidden root key operation. In certain examples, the encryption of the MAC address may be performed by any suitable hardware circuitry within the baseboard management controller including, but not limited to, a cryptography engine of the baseboard management controller. In an example, the key value may be generated by a module of the media controller in response to a seed value generated by hardware circuitry of the baseboard management controller. For example, any suitable module or component within the baseboard management controller including, but not limited to, a RKG module or DRKG module. In an example, the key value may be generated by any suitable method or function including, but not limited to, a PBKDF. For example, if the key value is generated using PBKDF, the module within a processor of the baseboard management controller may utilize any suitable function including, but not limited to, equation 1 above.

At block 408, a hash of the immutable attribute is generated based on the generated key value. In an example, the hash value and the immutable attribute may be provided to a media controller of the information handling system.

At block 410, a determination is made whether the baseboard management controller is authenticated. In an example, the determination may be made in any suitable manner including, but not limited to, comparing a hash value generated in the media controller to the hash value received from the baseboard management controller. In certain examples, a processor of the media controller may generate a hash of the immutable attribute based on a key value stored in the secure memory of the media controller. For example, a controller of the media controller may retrieve the key value stored in the secure memory during a factory process of the information handling system, and generate a hash of the immutable attribute based on the stored key value. The processor of the media controller may then compare the generated hash value to the hash value received from the baseboard management controller, and authenticate the baseboard management controller if the generated hash value matches the received hash value. If the baseboard management controller is not authenticated, a security policy for the device is initiated at block 412, and the method ends at block 414. In an example, the security policy may be any suitable policy to prevent access of the secure memory of the media controller. For example, the suitable policy may include, but is not limited to, disabling the hidden root key of the baseboard management controller, and disable the secure boot operation. In response to the security policy being initiated, the tamper proof sensitive data residing on an RPMB portion of the secure memory cannot be accessed. If, at block 410, the baseboard management controller is authenticated, the contents on the secure memory are verified at block 416. In an example, the contents of the secure memory may be verified based on the baseboard management controller being granted access to the secure memory. At block 418, the information handling system may launch a boot kernel, and the method ends at block 414. In an example, the boot kernel may be any suitable boot of the information handling system including, but not limited to, a secure boot mode of the information handling system.

Figure 5:
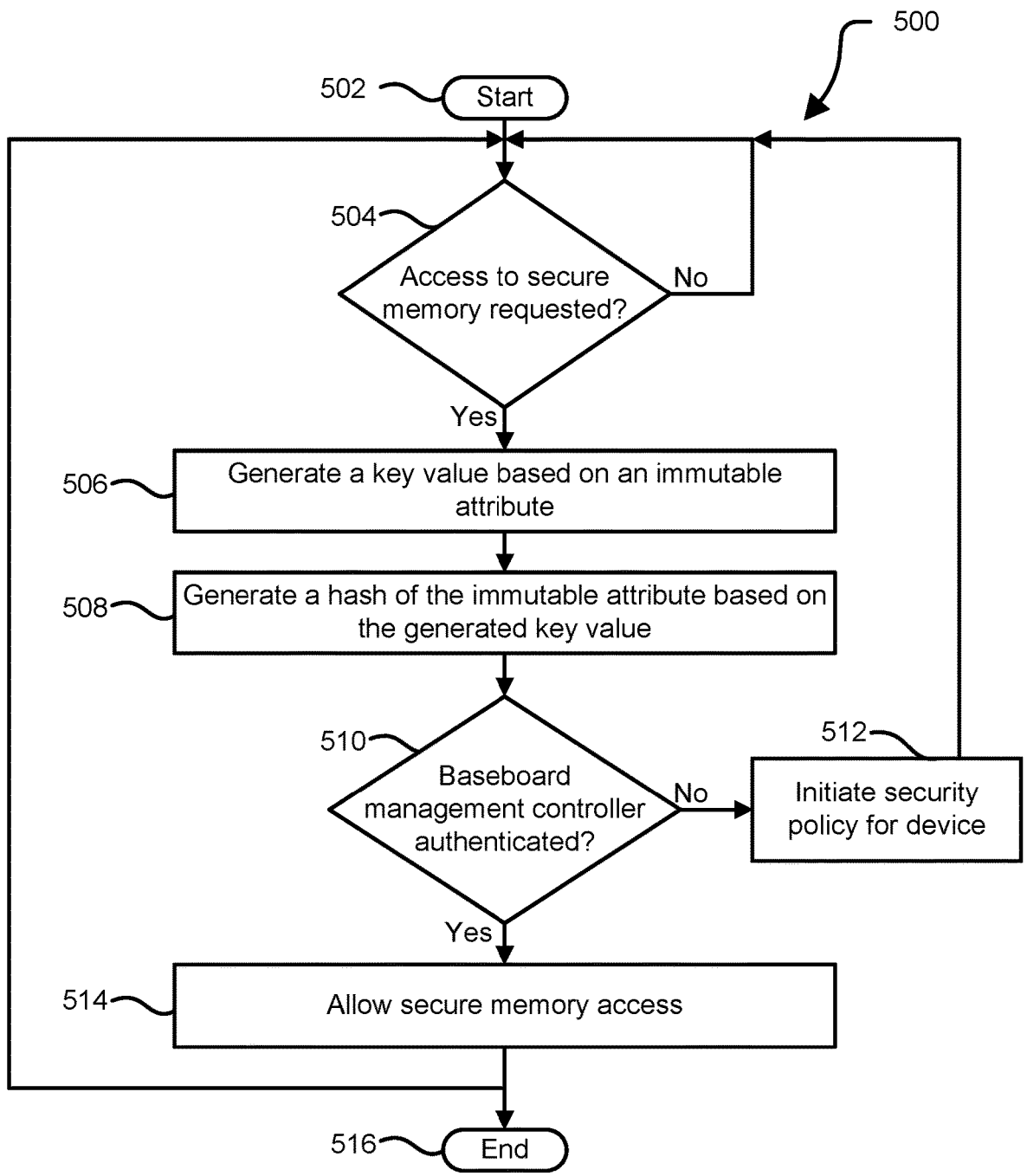
FIG. 5 is a flow diagram illustrating a method for authenticating a baseboard management controller access of a media controller during a runtime operation according to at least one embodiment of the disclosure.

FIG. 5 shows a method 500 for authenticating a baseboard management controller access of a media controller during a runtime operation according to at least one embodiment of the disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 5 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 5.

At block 504, a determination is made whether access to a secure memory has been requested. In an example, the access may be requested by any suitable device including, but not limited to, a baseboard management controller of an information handling system. In certain examples, the secure memory may be any suitable secure memory including, but not limited to, a secure memory of a media controller of the information handling system.

At block 506, a key value is generated based on an immutable attribute of the baseboard management controller. In an example, the immutable attribute may be any attribute that cannot be spoofed or otherwise manipulated after the secure memory is initially bond to the baseboard management controller during the factory process. For example, the immutable attribute may be any identifier associated with the baseboard management controller including, but not limited to, a MAC address of the baseboard management controller. In certain examples, the MAC address may be fused to the baseboard management controller, and the MAC address may be encrypted before the seed value is generated. In an example, the MAC address may be encrypted via any suitable operation including, but not limited to, a hidden root key operation. In certain examples, the encryption of the MAC address may be performed by any suitable hardware circuitry within the baseboard management controller including, but not limited to, a cryptography engine of the baseboard management controller. In an example, the key value may be generated by a module of the media controller in response to a seed value generated by hardware circuitry of the baseboard management controller. For example, any suitable module or component within the baseboard management controller including, but not limited to, a RKG module or DRKG module. In an example, the key value may be generated by any suitable method or function including, but not limited to, a PBKDF. For example, if the key value is generated using PBKDF, the module within a processor of the baseboard management controller may utilize any suitable function including, but not limited to, equation 1 above.

At block 508, a hash of the immutable attribute is generated based on the generated key value. In an example, the hash value and the immutable attribute may be provided to a media controller of the information handling system.

At block 510, a determination is made whether the baseboard management controller is authenticated. In an example, the determination may be made in any suitable manner including, but not limited to, comparing a hash generated in the media controller to the hash value received from the baseboard management controller. In certain examples, a processor of the media controller may generate a hash of the immutable attribute based on a key value stored in the secure memory of the media controller. For example, a controller of the media controller may retrieve the key value stored in the secure memory during a factory process of the information handling system, and generate a hash of the immutable attribute based on the stored key value. The processor of the media controller may then compare the generated hash value to the received hash value, and authenticate the baseboard management controller if the generated hash value matches the received hash value. If the baseboard management controller is not authenticated, a security policy for the device is initiated at block 512, and the method continues as stated above at block 504. In an example, the security policy may be any suitable policy to prevent access of the secure memory of the media controller. For example, the suitable policy may include, but is not limited to, disabling the hidden root key of the baseboard management controller, and disable the secure boot operation. In response to the security policy being initiated, the tamper proof sensitive data residing on an RPMB portion of the secure memory cannot be accessed. If, at block 510, the baseboard management controller is authenticated, access to the secure memory is allowed at block 514, and the method ends at block 516.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module may include software, including firmware embedded at a processor or software capable of operating a relevant environment of the information handling system. The device or module may also include a combination of the foregoing examples of hardware or software. Note that an information handling system may include an integrated circuit or a board-level product having portions thereof that may also be any combination of hardware and software.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
a baseboard management controller including a memory, wherein an immutable attribute of the baseboard management controller is fused in the memory during a factory process of the information handling system, wherein the immutable attribute cannot be changed after the immutable attribute is fused in the memory, the baseboard management controller to generate a first seed value based on the immutable attribute, to generate a first key value based on the first seed value, and to provide the first key value; and
a media controller to communicate with the baseboard management controller, the media controller including:
a secure memory; and
a processor to communicate with the baseboard management controller and with the secure memory, the processor to receive the first key value from the baseboard management controller, and to store, during the factory process, the first key value in the secure memory, wherein the first key value cryptographically links the secure memory to the baseboard management controller.

2. The information handling system of claim 1, during an operation of the information handling system:
the baseboard management controller to provide an access request of the secure memory, to generate a first hash of the immutable attribute, and to providing both the immutable attribute and the first hash to the media controller; and
the processor of the media controller to generate a second hash of the immutable attribute based on the stored first key value and the immutable attribute, to compare the second hash to the first hash, if the second hash matches the first hash, to allow access to data in the secure memory; and if the second hash does not match the first hash, to initiate a security policy for the information handling system, wherein the security policy prevents the baseboard management controller from accessing the data within the secure memory.

3. The information handling system of claim 2, wherein prior to the detecting of the access request: the baseboard management controller to begin a second execution of the bootloader program to launch the information handling system in a secure boot mode.

4. The information handling system of claim 1, wherein the baseboard management controller further includes:
a processor; and
hardware circuitry, wherein the generating of the first seed value comprises: the processor to retrieve the immutable attribute from the memory of the baseboard management controller, and to provide the immutable attribute to hardware circuitry, and the hardware circuitry to encrypt the immutable attribute, wherein the encrypted immutable attribute is the first seed value.

5. The information handling system of claim 4, wherein encrypting the immutable attribute comprises: the hardware circuitry to encrypt the immutable attribute via a hidden root key unique to the baseboard management controller.

6. The information handling system of claim 1, wherein the secure memory is embedded on a same die as the media controller.

7. The information handling system of claim 1, wherein the immutable attribute is a media access controller address of the baseboard management controller.

8. A method during a factory process of an information handling system, the method comprising:
beginning execution of a bootloader program of the information handling system;
generating a first seed value based on an immutable attribute of a baseboard management controller of the information handling system, wherein the immutable attribute of the baseboard management controller is fused in a memory of the baseboard management controller, wherein the immutable attribute cannot be changed after the immutable attribute is fused in the memory;
generating a first key value based on the first seed value;
providing the first key value to a media controller of the information handling system; and storing the first key value in a secure memory of the media controller, wherein the first key value cryptographically links the secure memory to the baseboard management controller.

9. The method of claim 8, further comprising:
during an operation of the information handling system:
  detecting an access request of the secure memory, wherein the access request is from the baseboard management controller;
  generating a first hash of the immutable attribute;
  providing both the immutable attribute and the first hash to the media controller;
  generating a second hash of the immutable attribute based on the first key value and the immutable attribute;
  comparing the second hash to the first hash;
  if the second hash matches the first hash, allowing access to data in the secure memory; and
  if the second hash does not match the first hash, initiating a security policy for the information handling system, wherein the security policy prevents the baseboard management controller from accessing the data within the secure memory.

10. The method of claim 9, wherein prior to the detecting of the access request, the method further comprises:
  beginning a second execution of the bootloader program to launch the information handling system in a secure boot mode.

11. The method of claim 8, wherein the generating of the first seed value comprises:
  retrieving the immutable attribute from a memory of the baseboard management controller;
  providing the immutable attribute to hardware circuitry; and
  encrypting, by the hardware circuitry, the immutable attribute, wherein the encrypted immutable attribute is the first seed value.

12. The method of claim 11, wherein encrypting the immutable attribute comprises:
  encrypting the immutable attribute via a hidden root key unique to the baseboard management controller.

13. The method of claim 8, wherein the secure memory is embedded on a same die as the media controller.

14. The method of claim 8, wherein the immutable attribute is a media access controller address of the baseboard management controller.

15. A non-transitory computer-readable medium including code that when executed by a processor causes the processor to perform a method, the method comprising:
during a factory process of an information handling system:
  beginning execution of a bootloader program of the information handling system;
  generating a first seed value based on an immutable attribute of a baseboard management controller of the information handling system, wherein the immutable attribute of the baseboard management controller is fused in a memory of the baseboard management controller, wherein the immutable attribute cannot be changed after the immutable attribute is fused in the memory;
  generating a first key value based on the first seed value; providing both the immutable attribute and the first seed value to a media controller of the information handling system; and
  storing the first key value in a secure memory of the media controller, wherein the first key value cryptographically links the secure memory to the baseboard management controller.

16. The non-transitory computer-readable medium of claim 15, further comprising:
during an operation of the information handling system:
  detecting an access request of the secure memory, wherein the access request is from the baseboard management controller;
  generating a first hash of the immutable attribute;
  providing both the immutable attribute and the first hash to the media controller;
  generating a second hash of the immutable attribute based on the first key value and the immutable attribute;
  comparing the second hash to the first hash stored in the secure memory;
  if the second hash matches the first hash, allowing access to data in the secure memory; and
  if the second hash does not match the first hash, initiating a security policy for the information handling system, wherein the security policy prevents the baseboard management controller from accessing the data within the secure memory.

17. The non-transitory computer-readable medium of claim 16, wherein prior to the detecting of the access request, the method further comprises:
  beginning a second execution of the bootloader program to launch the information handling system in a secure boot mode.

18. The non-transitory computer-readable medium of claim 15, wherein the generating of the first seed value comprises:
  retrieving the immutable attribute from a memory of the baseboard management controller;
  providing the immutable attribute to hardware circuitry; and
  encrypting, by the hardware circuitry, the immutable attribute, wherein the encrypted immutable attribute is the first seed value.

19. The non-transitory computer-readable medium of claim 18, wherein encrypting the immutable attribute comprises:
  encrypting the immutable attribute via a hidden root key unique to the baseboard management controller.

20. The non-transitory computer-readable medium of claim 15, wherein the immutable attribute is a media access controller address of the baseboard management controller.

* * * * *